(12) United States Patent
Brisson et al.

(10) Patent No.: US 10,467,685 B1
(45) Date of Patent: Nov. 5, 2019

(54) SYSTEM AND DEVICE FOR RENTAL DISPENSING OF UAVS

(71) Applicants: Stuart Brisson, Williamsburg, MA (US); Michelle Boisvert, Williamsburg, MA (US)

(72) Inventors: Stuart Brisson, Williamsburg, MA (US); Michelle Boisvert, Williamsburg, MA (US)

( * ) Notice: Subject to any disclaimer, the term of this patent is extended or adjusted under 35 U.S.C. 154(b) by 518 days.

(21) Appl. No.: 15/283,306

(22) Filed: Oct. 1, 2016

(51) Int. Cl.
*G06Q 30/06* (2012.01)
*G06Q 10/08* (2012.01)
*B64C 39/02* (2006.01)
*B64F 1/22* (2006.01)
*B64F 1/36* (2017.01)

(52) U.S. Cl.
CPC ....... *G06Q 30/0645* (2013.01); *B64C 39/024* (2013.01); *B64F 1/222* (2013.01); *B64F 1/36* (2013.01); *G06Q 10/083* (2013.01); *B64C 2201/141* (2013.01); *B64C 2201/201* (2013.01)

(58) Field of Classification Search
CPC ...................... B64C 2201/201; G06Q 30/0645
USPC .................................................. 320/107, 115
See application file for complete search history.

(56) References Cited

U.S. PATENT DOCUMENTS

| | | | |
|---|---|---|---|
| 8,511,606 B1 * | 8/2013 | Lutke | B64C 39/028 244/100 R |
| 9,254,363 B2 | 2/2016 | Levien et al. | |
| 9,387,928 B1 | 7/2016 | Gentry et al. | |
| 9,429,953 B1 | 8/2016 | Miller et al. | |
| 9,434,267 B2 | 9/2016 | Wang et al. | |
| 9,499,265 B2 * | 11/2016 | Sanz | B64F 1/02 |
| 9,777,502 B2 * | 10/2017 | Curlander | E04H 14/00 |
| 9,880,563 B2 * | 1/2018 | Fisher | B64C 29/02 |
| 9,977,435 B2 * | 5/2018 | Fisher | B60L 53/51 |
| 10,239,638 B1 * | 3/2019 | Cohen | B64F 1/04 |
| 2015/0063959 A1 | 3/2015 | Saad et al. | |
| 2016/0001883 A1 | 1/2016 | Sanz et al. | |
| 2016/0063642 A1 | 3/2016 | Luciani et al. | |
| 2016/0229299 A1 * | 8/2016 | Streett | B64C 39/024 |

(Continued)

OTHER PUBLICATIONS

Gregory S. McNeal, Six Things You Should Know About Amazon's Drones, Internet, Sep. 8, 2016, 9 pgs, Forbes.

(Continued)

*Primary Examiner* — Richard V Muralidar
(74) *Attorney, Agent, or Firm* — Stan Collier, Esq

(57) ABSTRACT

A UAV rental dispensing system employs a vending device that a consumer can rent a UAV from for a variety purposes requiring a video function thereon. The vending device may have multiple drones/UAVs enclosed therein, and be placed in predetermined locations. The vending device would provide launch and recovery, storage, power, charging, diagnostics and data transfer. Although the vending device will include an interface screen for accessing information, transactions may occur over the Internet or phone/data lines via a smart phone app or the like. The device will have a hinge or sliding door thereon with a landing pad/docket inside for charging of the batteries. After charging, the drone will be moved to a storage section automatically. When the drone is to be used, the reverse will occur. The level of charge will be checked before exiting the vending machine with necessary flight information uploaded by data lines or wirelessly.

17 Claims, 12 Drawing Sheets

(56) References Cited

U.S. PATENT DOCUMENTS

2016/0253908 A1    9/2016  Chambers et al.
2016/0364989 A1\*  12/2016  Speasl .................. G08G 5/0034
2017/0178222 A1\*  6/2017  High .................... H04N 13/204
2017/0255896 A1\*  9/2017  Van Dyke ............ G06Q 10/083

OTHER PUBLICATIONS

Unk, It's official, flying a drone is now so simple that a toddler could do it, http://nofilmschool.com/2015, 2016, 3 pgs.
Unk, Your Waterpproof Throw and Go Flying Camera, https://www.lily.camera, Internet, 2016, 6 pgs.

\* cited by examiner

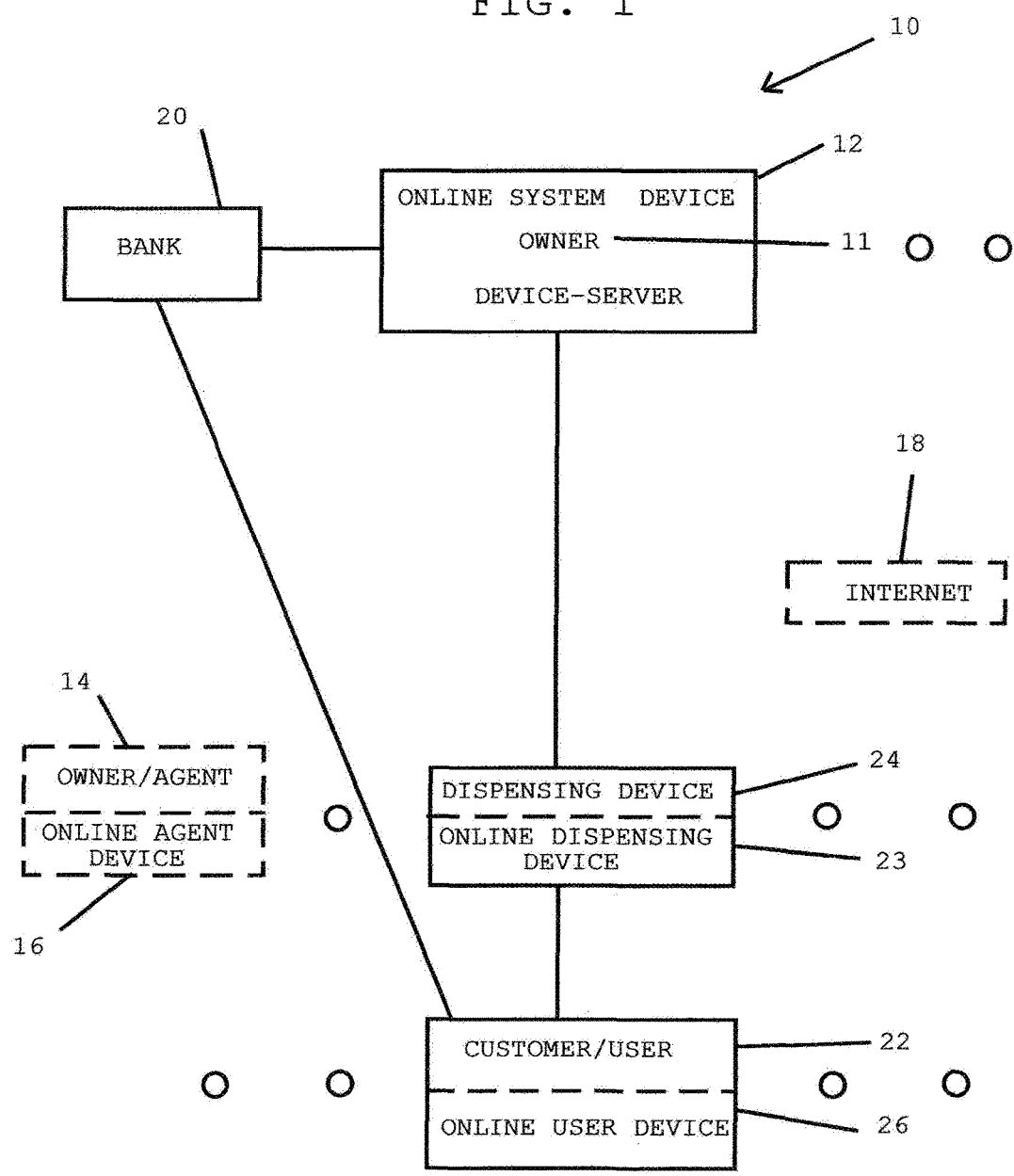

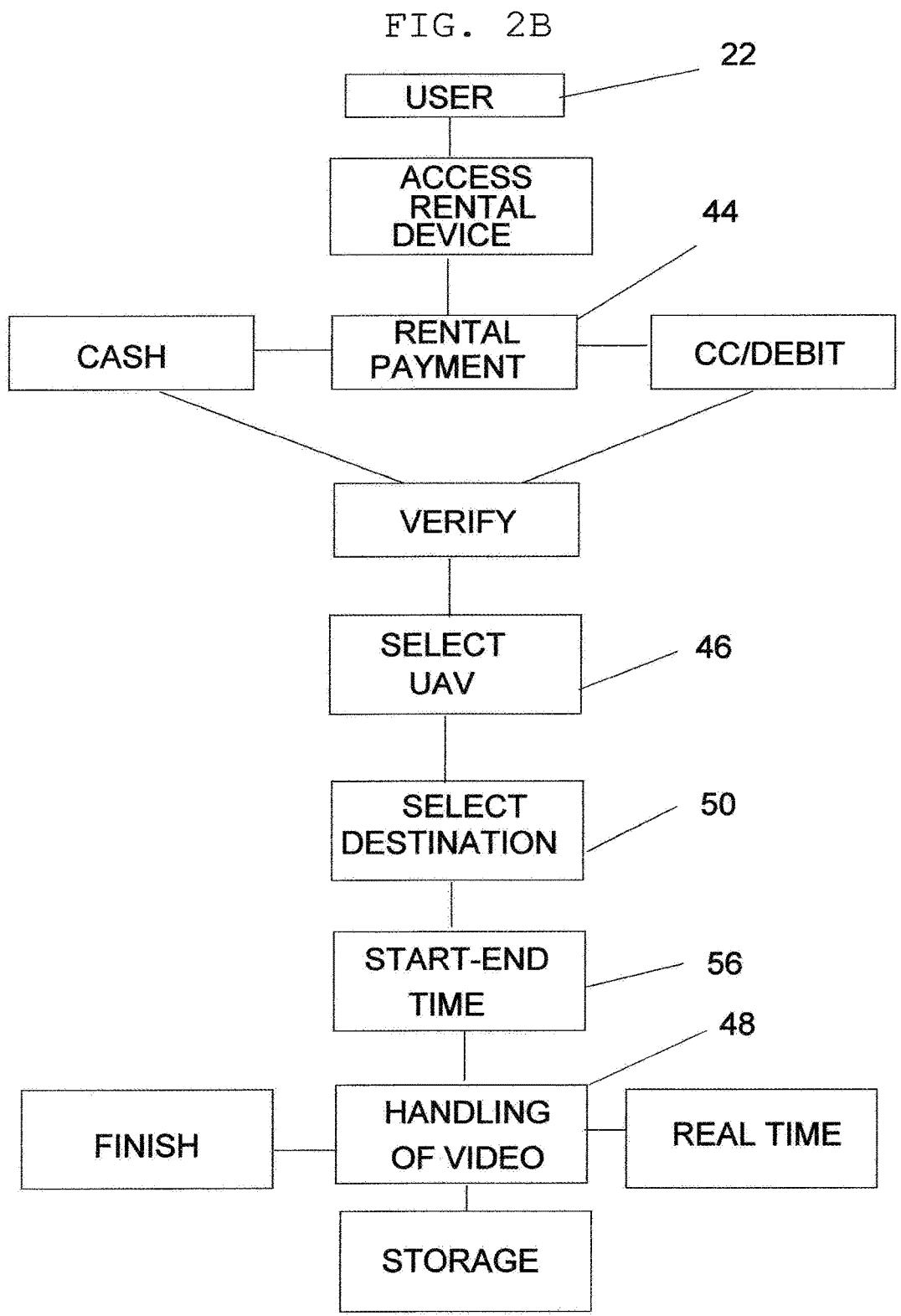

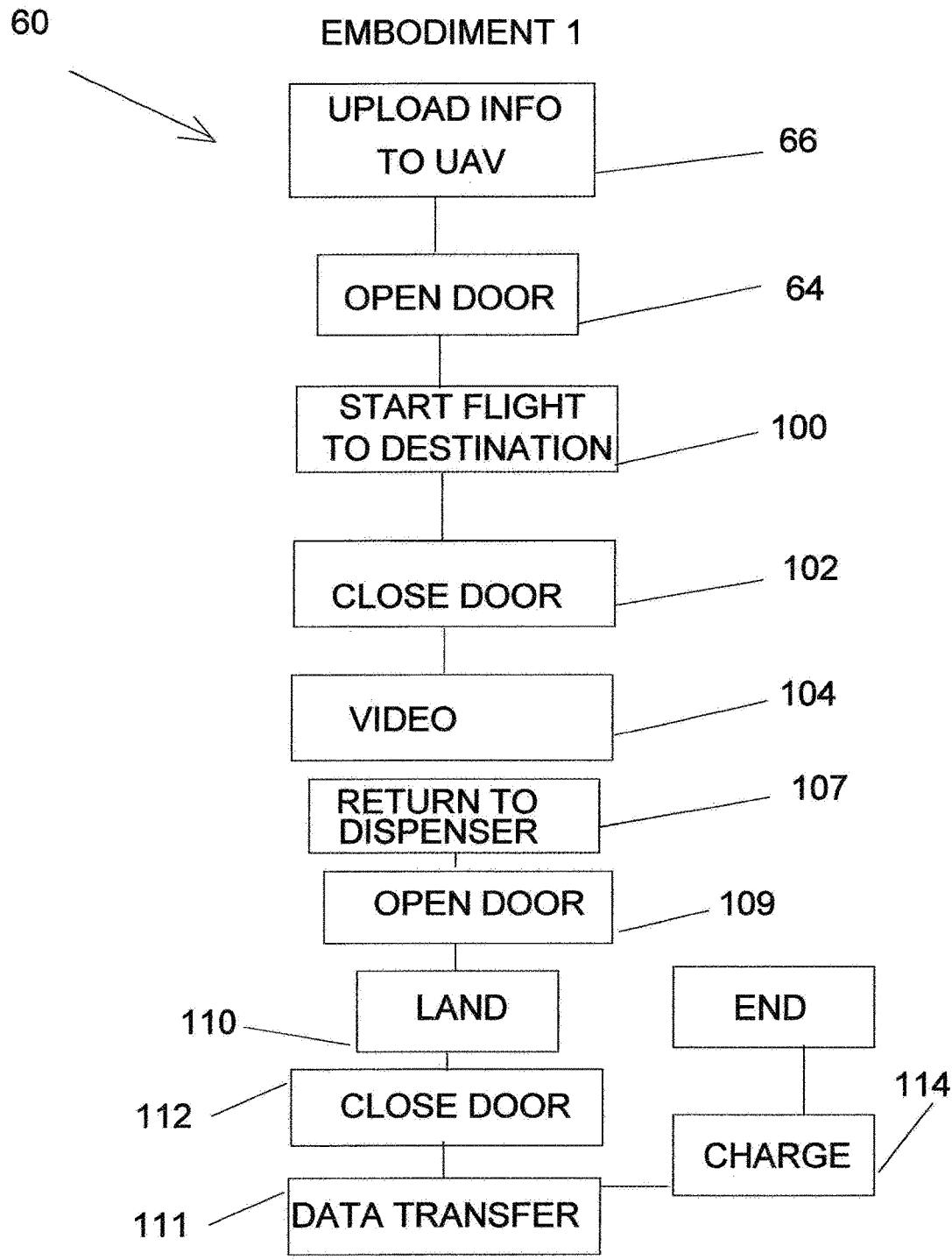

FIG. 3B
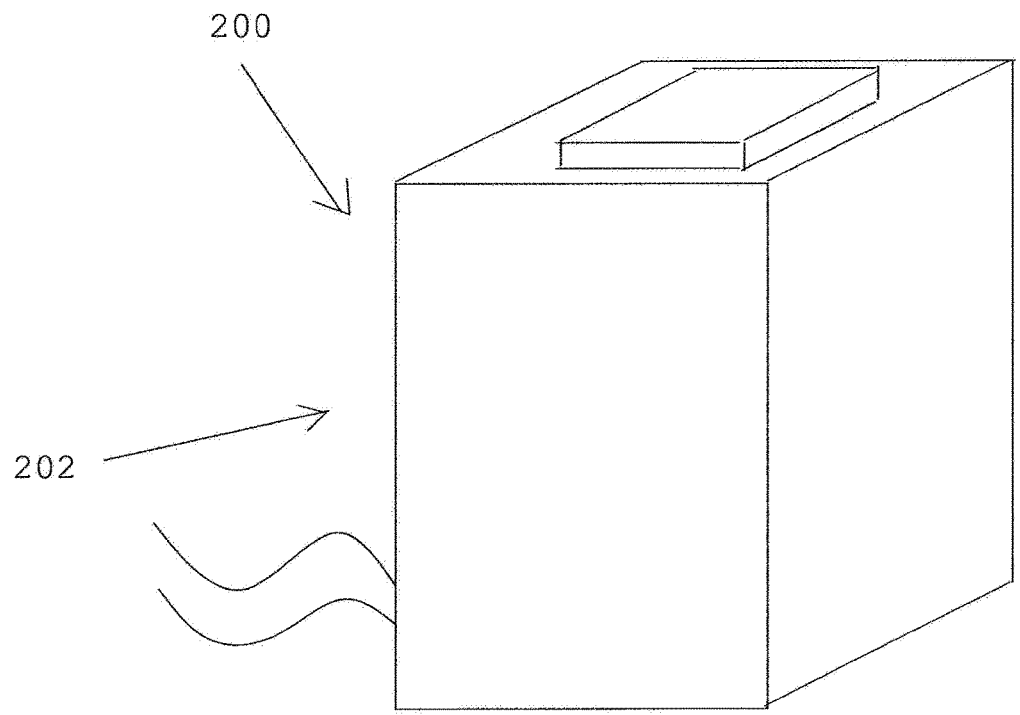
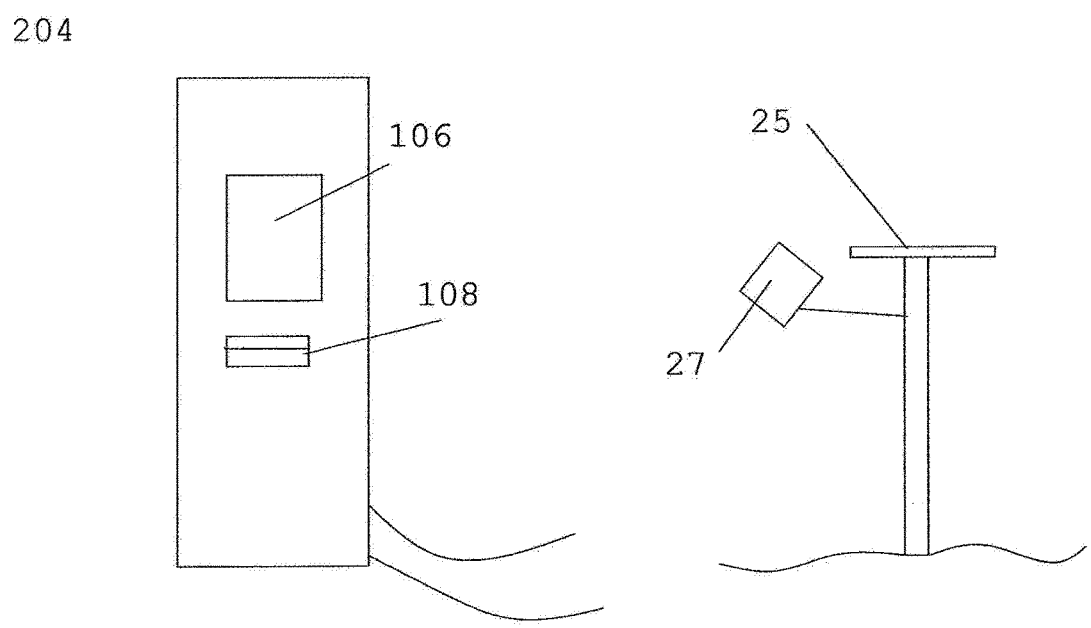

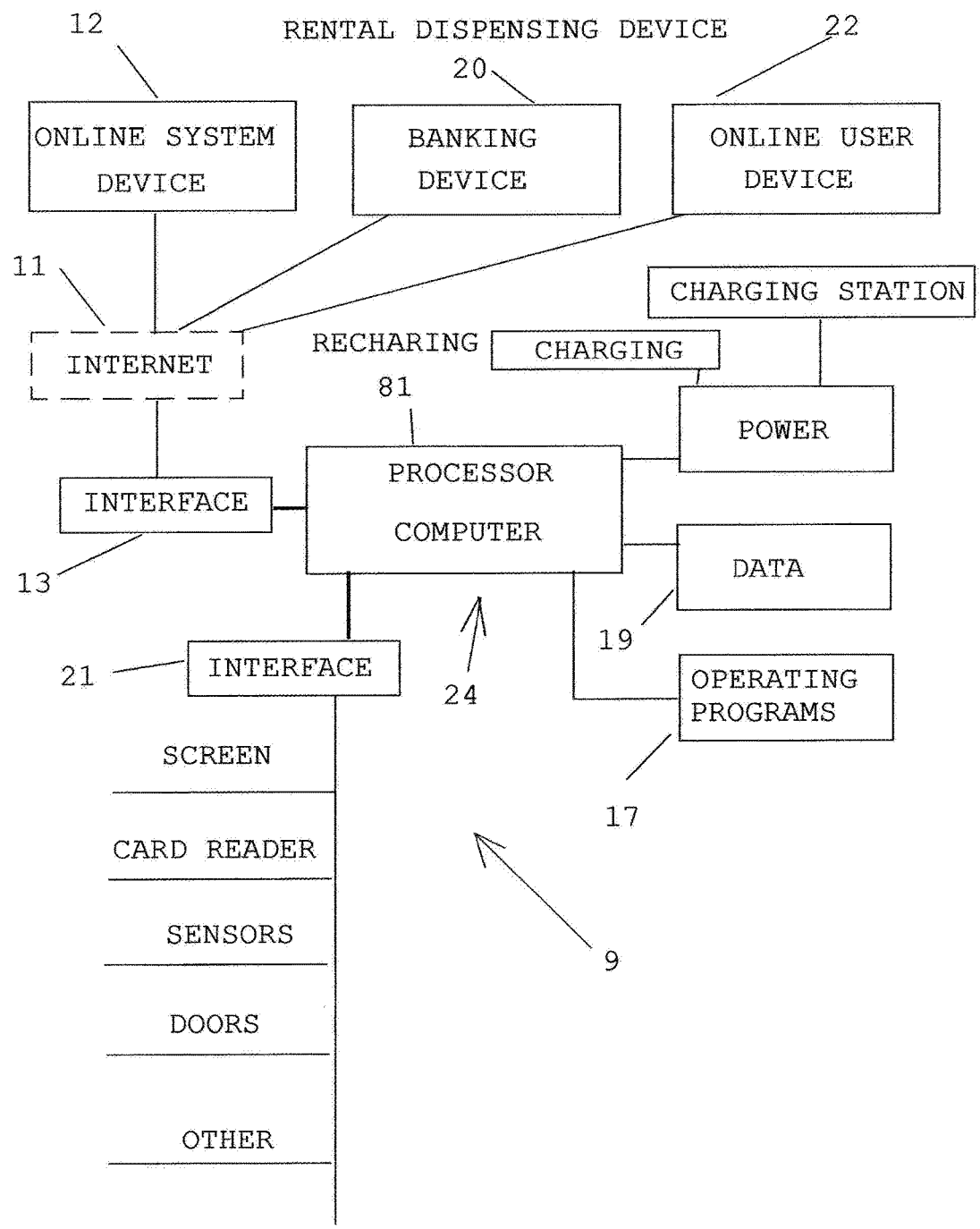

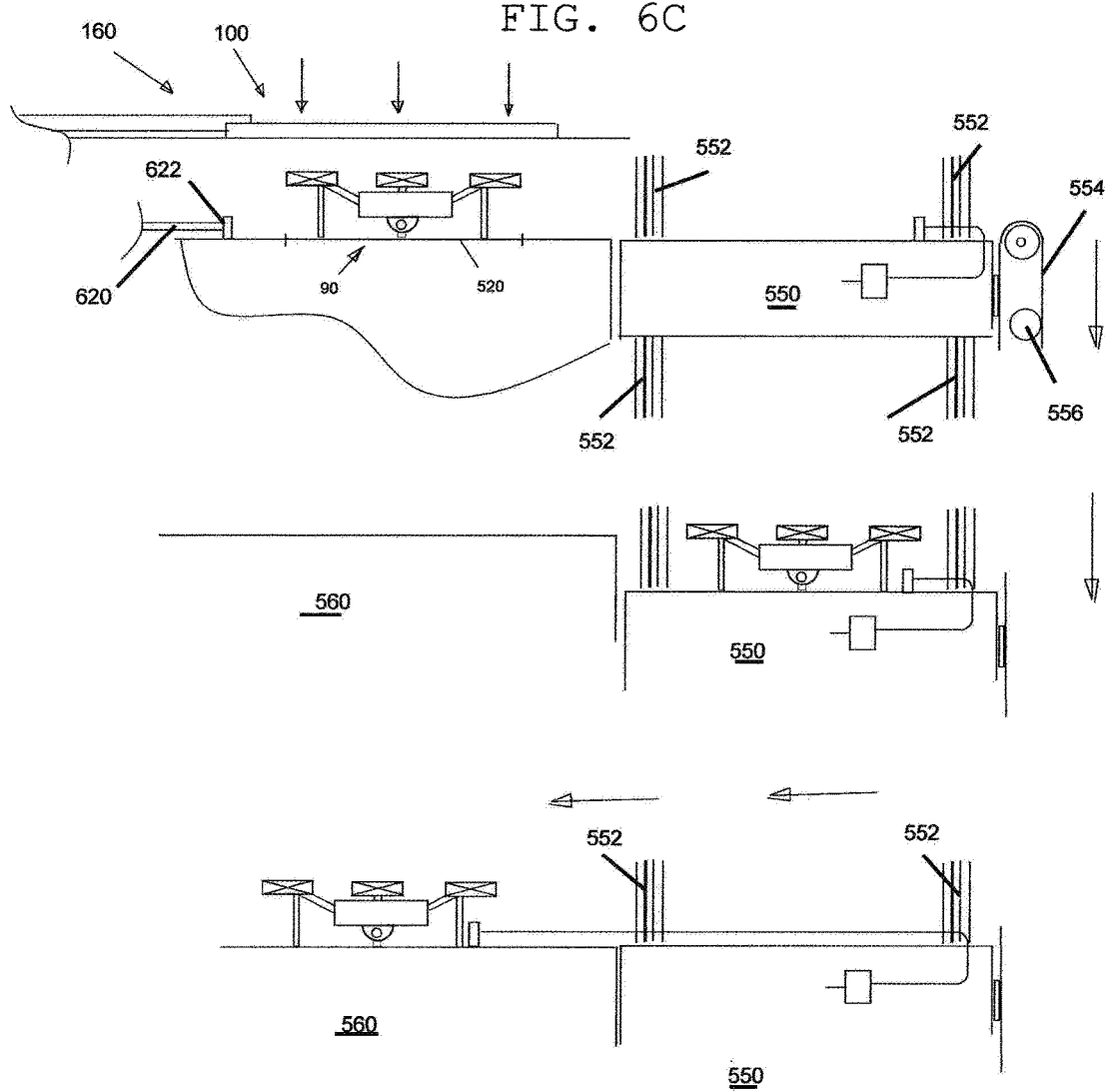

SYSTEM AND DEVICE FOR RENTAL DISPENSING OF UAVS

Cross References to Related Applications: NA
Reference to Federally sponsored research or development: NA
Reference to joint research agreements: NA
Reference to Sequence Listing: NA

BACKGROUND OF THE INVENTION

Field of the Invention

The present invention relates to flying devices, and, more particularly, relates to UAVs and drones, and, in greater particularity, relates to means for rental dispensing of these flying devices having video cameras thereon.

Description of the Prior Art

The use of drones/UAVs to deliver packages by Amazon and others has created a new environment that is discussed in an Article titled, "Six Things You Should Know About Amazon's Drones", from Forbes.com, 2014, author Gregory McNeal. The article discusses the requirement for FAA approval for commercial use of drones. The drone's capabilities are discussed on page 4. The use of geofencing to restrict flight paths is noted.

US 2015/0063959 discusses a vehicle base station for autonomous vehicles without any detailed showing as to the base station or actual UAVs. Uses noted are for industrial, law enforcement and military for carrying payloads.

US 2016/0001883 discusses autonomously landing a UAV on a ground station where there is a self-aligning charging station due to lack of an operator being in close vicinity thereto. The UAV is noted as having a GPS unit for flight. Further discuss having video available on the UAV for a variety of purposes noted.

US 2016/0063642 discusses the use of a UAV to collect insurance information from an accident scene for example.

US 2016/0253908 discusses the use of a UAV to deliver a package from a distribution center and receives real-time information about the flight route and also updates that information.

US 2016/0257423 discusses the use of UAV to deliver packages to raised platforms.

US 2016/0257426 discuses having a UAV land at a unique docking station for charging.

U.S. Pat. No. 9,254,363 discusses details of various embodiments of the use of a UAV and shows the use of a "kiosk" for storage and having electrical contacts therein for charging and data transfer. It appears that the UAV does not land in the bays but is placed there by a user. It does not have any doors as such. It does not discuss any type of rental dispensing system or device, but does have many uses such as security. See FIG. 2 and FIG. 34.

U.S. Pat. No. 9,387,928 discusses docking stations for the delivery of packages. Notes that the docking stations may be used to recharge.

U.S. Pat. No. 9,429,953 discusses a system for autonomously landing a UAV.

U.S. Pat. No. 9,434,267 discusses autonomously landing a UAV on an energy provision station for changing batteries. A very complex structure is shown.

All of the articles, patent applications and patents mentioned are incorporated herein as to their teachings.

Accordingly, with the advent of the selfie culture, there is a need for UAVs with video capabilities by more people interested in pictures and videos of themselves during activities. Although cell phones and smart phones provide a primary source, other means may be available due to advancing technology.

SUMMARY OF THE INVENTION

The present invention is a UAV rental dispensing system that employs a vending device that a consumer can rent a UAV from for a variety purposes requiring a video function thereon. The vending device nay have multiple drones/UAVs enclosed therein, preferably autonomous, semi-autonomous and even hands-on. These devices are placed in predetermined locations. The vending device would provide launch and recovery, storage, power, charging, diagnostics such as battery status and data transfer. Although the vending device will include an interface screen for accessing information, transactions may occur over the Internet or phone/data lines via a smart phone app or the like.

The vending device will essentially be a container having a hinge or sliding door thereon with a landing docket inside for charging of the batteries and storage. The landing docket may be outside of the container, but then the UAV would be moved therein for storage, in particular. The charging may be by wireless means or by direct contact with an electrical device such as a landing pad with unique shaped charging plates, or via direct plug-in. After charging, the drone will be moved to a storage section automatically. There may be more than one drone and thus more than one charging station. When the drone is to be used, the reverse occurs. The level of charge will be checked before exiting the vending machine with necessary flight information uploaded by data lines or wirelessly.

An interface screen on the housing will be for entering and viewing information such as a credit card, requested activity, etc., as well as potential advertising.

A wireless or wired data interface will communicate with the drone's computer from a central computer or a computer in the container, and information will be entered, for example, such as the GPS starting point, the GPS end point including the GPS coordinates of the smart phone or signal of an external tracker the customer may have on their person during the drone use, (see http://www.lily.camera showing remote tracker as of Sep. 15,2016), hazards, man-made hazards, no-fly zones (see http://www.nofilmschool.com showing the use of a smart phone to draw flight track as of Sep. 15, 2016), and the maximum length of time to video record the customer and the video file to be transferred upon return. The drone may further be requested to transmit video information to another source, such as the smart phone of the customer for immediate and real-time viewing or storing the information on a SD card or the like.

An object of the present invention is to provide a system for renting UAVs to customers desirous of recording their activities.

It is another object of the present invention to provide a system for renting UAVs that operate autonomously or semi-autonomously.

It is a further object of the present invention to provide a rental dispensing device for one or more UAVs that may be accessed directly by the customer or wirelessly by smart phones.

It is still a further object of the present invention to provide a rental dispensing device that charges by direct contact battery powered UAVs that connect thereto without special alignment structures.

It is yet a further object of the present invention to provide a rental dispensing device that consists of a separated storage device and interface screen.

It is yet a further object of the present invention to provide a system for renting UAVs that are singly stored in the renting device, stored on a sliding shelf, or stored on shelves accessed by an elevator device or other mechanical device.

These and other objects, features, and advantages of the present invention will become more readily apparent from the attached drawings and the detailed description of the preferred embodiments, which follow.

BRIEF DESCRIPTION OF THE DRAWINGS

FIG. 1 is a schematic of the system for rental dispensing of UAVs and drones of the present invention;

FIG. 2B is a flow diagram for the interface screen; FIG. 2C is flow chart of actions of dispensing device for a UAV mission;

FIG. 3B is a further illustration of another embodiment of the dispensing device where a user interface device is separated from a distal dispensing device of the present invention;

FIG. 3C is a partial system schematic of the rental system showing a processor in the rental dispensing device interacting with other online devices and devices within the dispensing device;

FIG. 6C is third embodiment of a storage section shown in multiple sequences with one portal above, one landing area thereunder, and an elevator for moving the UAV to a single UAV storage section shelf of the present invention.

Like reference numerals refer to like parts throughout the several views of the drawings. The drawings are representations of various aspects of the present invention, and clearly one skilled in the art would be able to devise other possible means for accomplishing the same feature.

DETAILED DESCRIPTION OF THE PREFERRED EMBODIMENTS

Figure 2A:
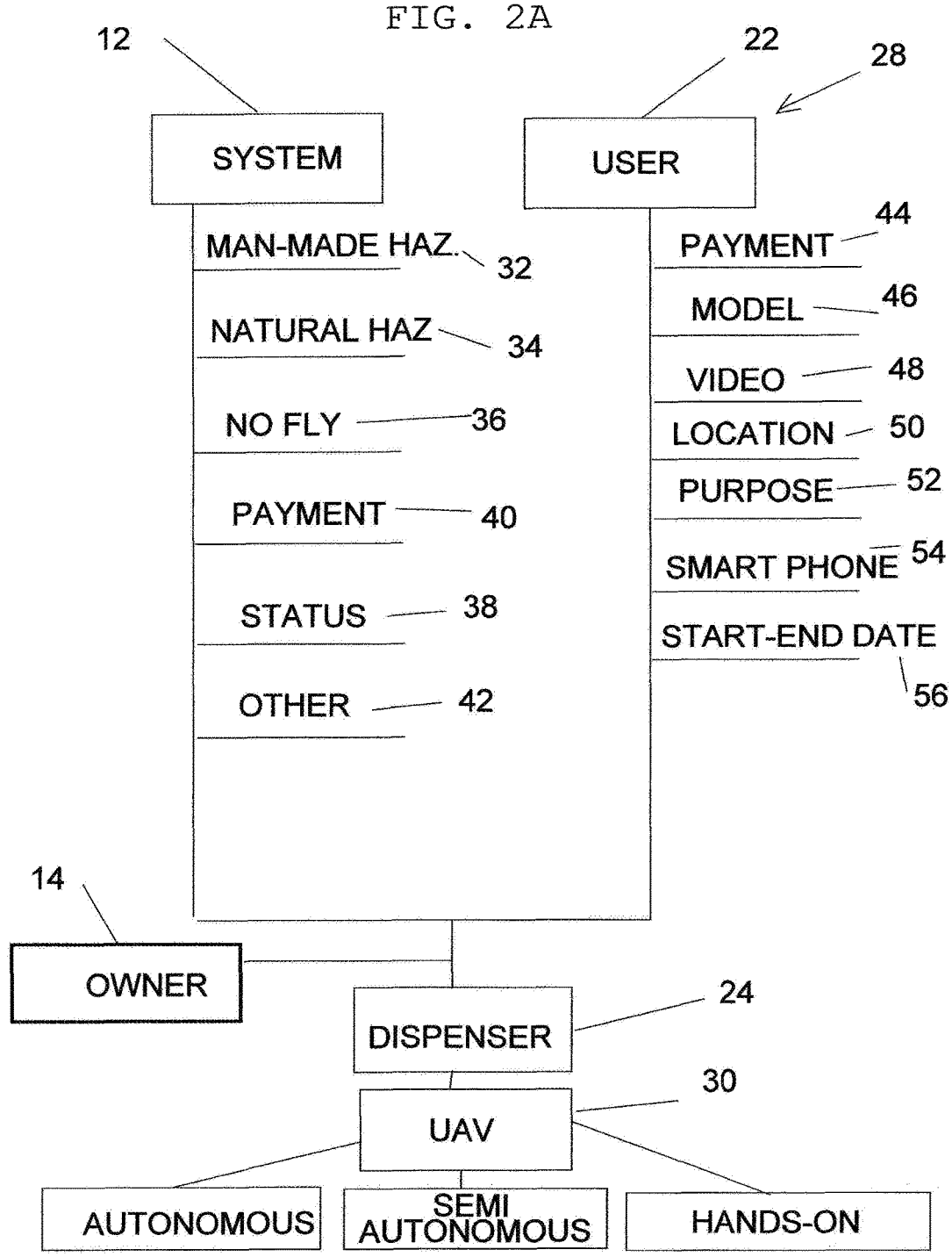
FIG. 2A further illustrates inputs into the dispensing device of the present invention.

In general, the present invention provides a UAV rental dispensing system that employs a stand-alone rental dispensing device from which a consumer can rent a UAV for a variety purposes requiring a video function thereon, for example. It should be understood that the term "UAV" is broadly used herein and would include drones also. The rental dispensing device may have multiple drones/UAVs enclosed therein, and be placed in predetermined locations. The rental dispending device would provide launch and recovery, storage, power, charging, diagnostics and data transfer. Although the rental dispensing device will include an interface screen for accessing information, transactions may occur over the Internet or phone/data lines via a smart phone app or the like.

The rental dispensing device twill have a hinge or sliding door thereon with a landing docket/pad inside for charging of the batteries and a further embodiment may have separate landing docket/pad from a charging station. Although a particular recharging device is shown, the prior art also shows different devices for such and clearly these or others may be adapted by one skilled in the art after understanding the present invention. After charging, the drone may be moved to a storage section automatically. When the drone is to be used, the reverse occurs. The level of charge will be checked before exiting the rental dispensing device with necessary flight information uploaded by data lines or wirelessly.

The present invention provides autonomous or semi-autonomous drone, preferably, rentals from a rental dispensing device that a consumer can rent for a variety purposes such as sports, camping, security, and other activities. The rental drones are like or similar to quadcopter drones and have video cameras, but other types of drones or UAVs are clearly encompassed such as ones being semi-autonomous with tracking devices or even being hands-on.

It is further possible that an owner/agent may observe actions of a flight mission to insure safety, quality, and compliance with any other terms. A banned activity may be use of the UAV for drug delivery. For example, the owner/agent may observe the landing of the UAV on the landing pad to insure proper landing on a charging pad. Control of the UAV by the owner/agent may override the customer/user directions.

In greater detail, referring to FIG. 1, a rental system 10 for UAVs comprises one or more online system devices 12 being operated by one or more owners 11 of the rental system 10. Although an owner/agent 14 may be the operator, other operators 11 may be included and they would interact with the online system device 12 by one or more online agent devices 16 that communicate with the online system devices 12 via the Internet 18 or other means of communications including by cable and/or wirelessly. The agent online device 14 is within dashed lines. It is further contemplated that the owner 11 would visit periodically the dispensing device 24. Monetary transactions will occur by the above including a user/customer 22 with one or more online banking devices 20 for managing the rental of UAVs from the dispensing devices 24. In addition to monetary transactions, the user 22 would communicate via one or more online user devices 26 such as smart phones for communicating information regarding the rental of the UAVs to the other parties noted.

Referring to FIG. 2A and FIG. 2B, information flow 28 is input into one or more rental dispensing devices 24 from an online system device 12 and from an online customer/user device 22 for controlling and managing the rental system 10 for UAVs, such information may include flight path information such as man-made hazards 32 such a power lines, natural hazards 34 such as mountains, trees, no-fly areas 36 such as airports, status information 38 of the UAVs, whether fully charged, user payment information 40, and other 42 information. The customer/user 22, for example, would input information such as payment method 44, model of UAV 46, handling of any video data 48, location 50 of the user when the video is used, purpose 52 of the mission, and date and time 56. The customer/user 22 may use a smart phone, tablet, laptop, desktop computer, or any other device providing communication through the Internet.

Figure 3A:
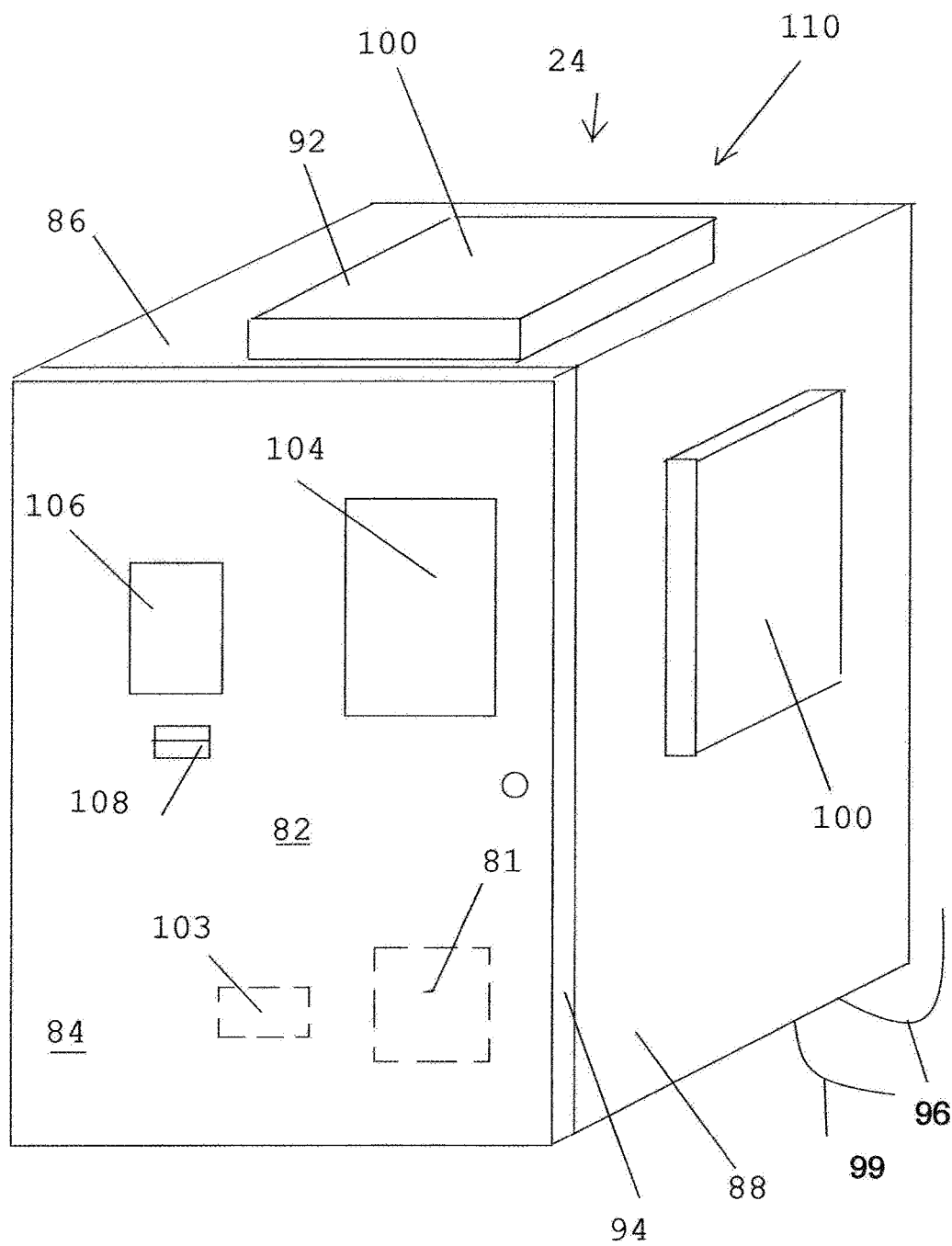
FIG. 3A is a perspective view of the dispensing device of the present invention.

FIG. 2C is a flow chart 60 of the steps for using the UAV from a dispensing device 24 having an embodiment where the UAV is stored directly under a door as will be detailed below. All of the necessary information such as shown in FIGS. 2A and 2B is uploaded 62 to the UAV. On the appropriate date and time, a portal door 100 of FIG. 3A is opened 64. A UAV 90, FIG. 5A, flies from the portal 100 to start the mission. Upon leaving, the portal door 80 is closed 102. The UAV 90 will then fly to the destination and commence video recording 104. At the end time, the UAV 90 will return 107 and the door 80 is opened 109. The UAV 90 lands 110 on a landing pad 120, FIG. 5B, the door 80 is closed 112, and the UAV is recharged 114 in the dispensing device 24 and then transfers data 111. The recharging may occur at another location than the landing docket/pad in the dispenser. The UAV would be moved to that location from the landing docket/pad.

The dispensing device 24 of FIG. 3A may have multiple drones enclosed therein, and be placed in multiple locations as determined by the system owner. Electric drones like quadcopters have flight times of half hour and less and thus must be very near any intended use and possibly have a separate charging station 25, FIG. 3B. The dispensing device 24 provides, in general, (1) rental dispensing agreements and terms and payment, (2) launch and recovery, (3) storage, (4) power, i.e., charging (5) diagnostics, and (5) data transfer.

A further embodiment is a drone dispensing device 24 for a typical quadcopter drone that may be semi-autonomous or hands-on. The hand controller/smart phone would be provided to the customer/user from the dispensing device and it may include a video screen to interact with the drone as necessary. Also any other necessary device such as an active tracking device may also be dispensed. Such availability of hands-on drones would be for such activity as drone racing or even selfies.

In FIG. 3A, the rental dispensing device 24 is shown as a stand-alone device. The dispensing device 24 has a housing 82 being box-like. The housing 82 may be about 6 feet high, 4 feet wide and 4 feet deep. It is made of durable walls for security. One or more portals 100 are for the UAVs 90 to enter and exit the housing 82. The portals 100 may be in a top 86 or a side 88 and each has a portal door 92. The portal doors 92 may be a hinged door 150 or a sliding door 160, FIGS. 4A and 4B. These doors 92 are electrically operated to open and close upon command and monitored by sensors, not shown, but understood to be used by one skilled in the art. The doors 92 are tightly closed to protect the interior of the housing 82 from the weather, animals, and possible vandals. Unauthorized opening of the portal doors 92 may also trigger an alarm. A maintenance door 94 allows access to the interior. The dispensing device 24 is electrically connected by cables 96 to a source of power, not shown. Also a data cable 99 may be included as well as a wireless device, not shown, to communicate. The power line is connected to a voltage converter 103, being conventional, that provides a charging voltage. The housing 82 may also include a window 104 to see the inside, an interface screen 106, and a card reading device 108. Presently most electronic drones like quadcopters have a limited operation time of less than about half an hour. It is thus possible to have a separated charging station 25, FIG. 3B, in the area of operations so that the drone does not have to return to the main dispensing device 12.

Referring to FIG. 3C, a system 9 incorporating the invention is illustrated therein. The different parties/users communicate over the Internet 11 being the online system device 12, the online banking device 20, and the online user device 22. The rental dispensing device 24 has a computer/processor 81 that runs an operating program 17 as herein detailed that controls a power source for recharging and a charging station 25, data 19 provides for storage of information as noted herein to operate the UAVs and the dispensing device 24. Interfaces 21 are included to connect to the interface screen 106, card reading device 108, doors, and other sensors and motors for the movement of the UAV in the housing 24.

The interface screen 106 is driven by a programmed computer 81 within the housing 24 that contains an operating program to allow a user to enter pertinent information in the rental of the UAV. The computer 81 or other conventional device such as an Internet interface may provide Internet access, data handling, and communications. See patents in the background section as to their teachings. This screen can also be used to show advertising. A means for storing 110 the UAVs therein will be further shown below. FIG. 3B is an embodiment where the rental dispensing device 200 is separated into two devices 202 and 204 and may include a separated charging station 25 that may be powered by solar panels 27. FIG. 3B, an alternative container 202 contains the UAVs and associated mechanical and electrical means. The alternative container 202 may be placed in a protected location such as on a roof of a building. The customer accessible device 204 may be on the ground, attached to a building wall, inside a building, etc. As shown thereon is the interface screen 106 and the card reading device 108. Appropriate electrical and data wires and cable are thereon as are conventional. A wireless data means may also be included.

Figure 4A:
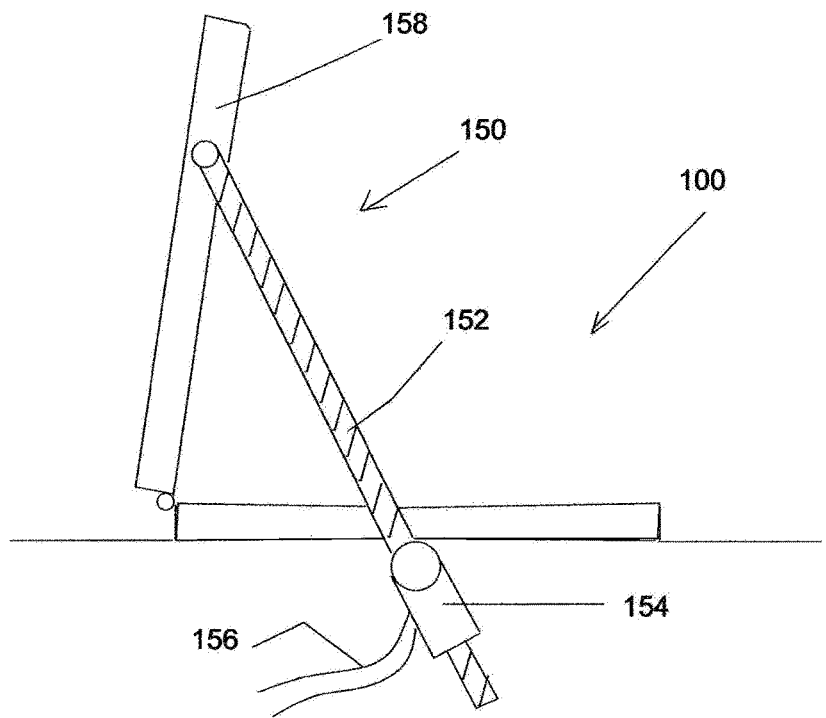
FIG. 4A is one embodiment of a portal door being a hinged lid of the present invention.
Figure 4B:
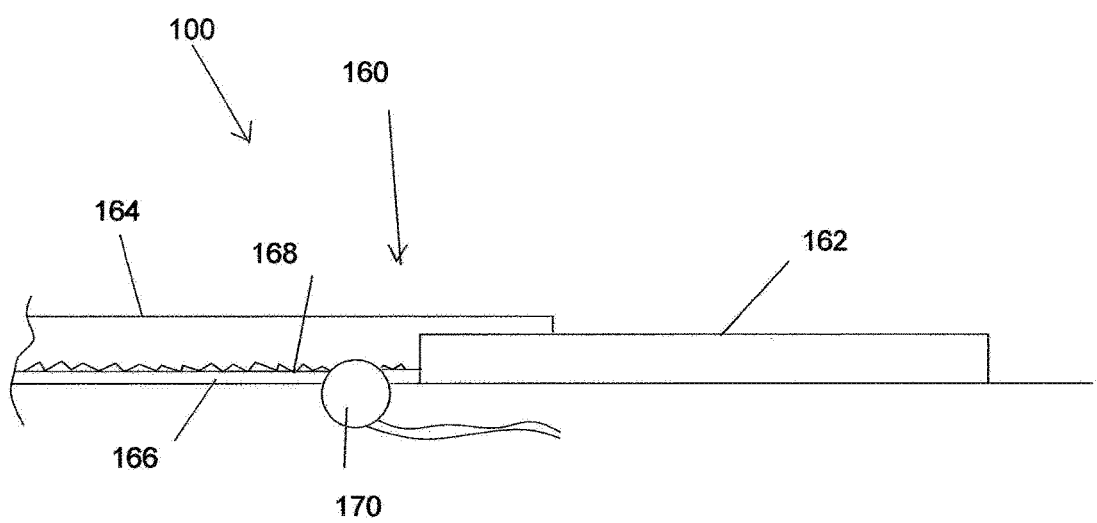
FIG. 4B is another embodiment of a portal door being a sliding door of the present invention.

Referring to FIG. 4A and 4B, the portal 100 has at least one portal door being a hinged door 150 or a sliding door 160 as shown. Other doors may be possible such as a double door. These doors provide weather protection and security protection to the equipment. The hinged door 150 is opened and closed by a screw shaft 152 that is pivoted at the top to a door flange 158 or other devices and at the bottom to a pivoted flange having a screw driver 154. Appropriate electrical wires 156 are used to operate the screw driver 154. Sensors, not shown, would indicate the open condition of the door. All wiring necessary for any devices in the housing 82 are not shown, but should be understood to be there by one skilled in the art. The sliding door 160 in FIG. 4B covers a door frame 162 with the portal therein. The sliding door frame 164 slides upon a pair of rails 166, one shown, with a rack gear 168 engaged to a pinion gear and driver 170.

Figure 5A:
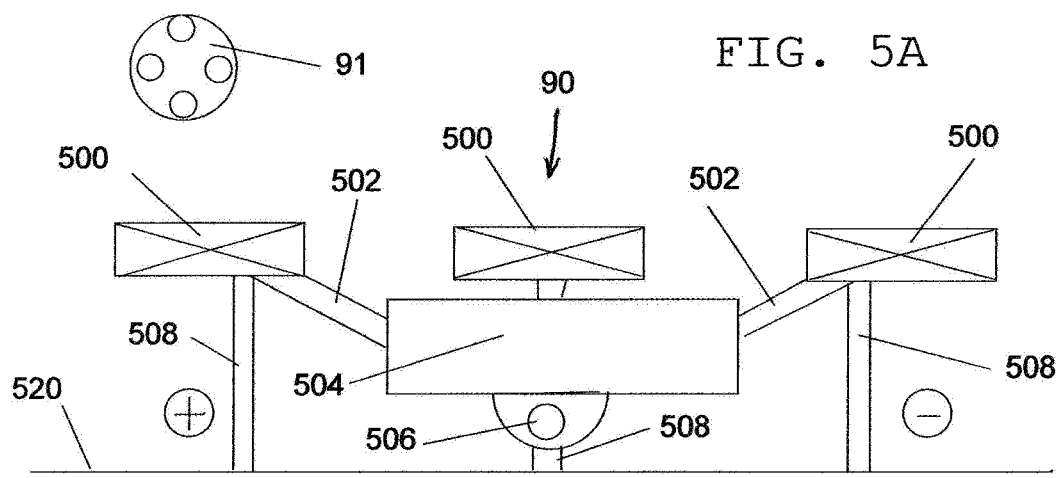
FIG. 5A is one embodiment of a UAV being shown schematically as a quadcopter having charging contacts located in the landing legs of the present invention.
Figure 5B:
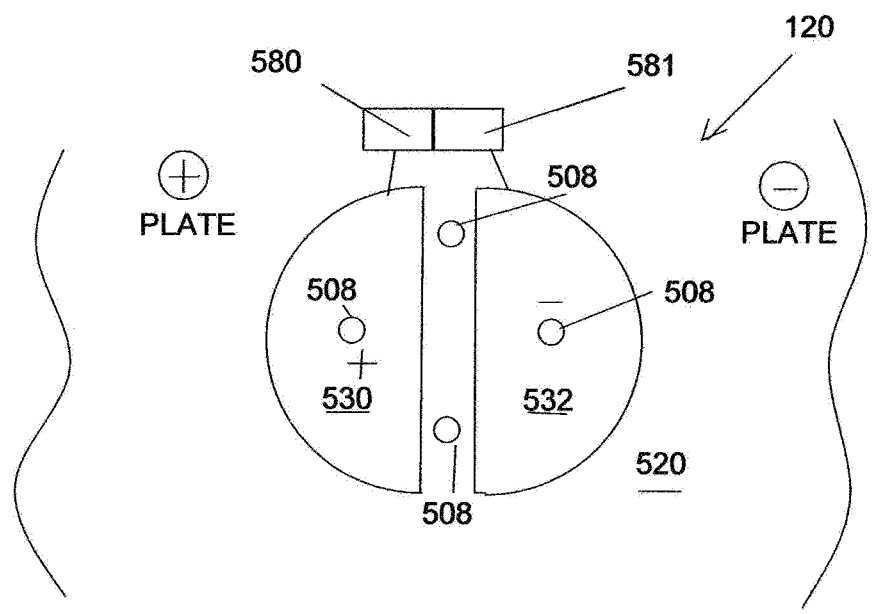
FIG. 5B shows a landing deck having a charging surface for use with the UAV shown in FIG. 5A of the present invention.
Figure 7:
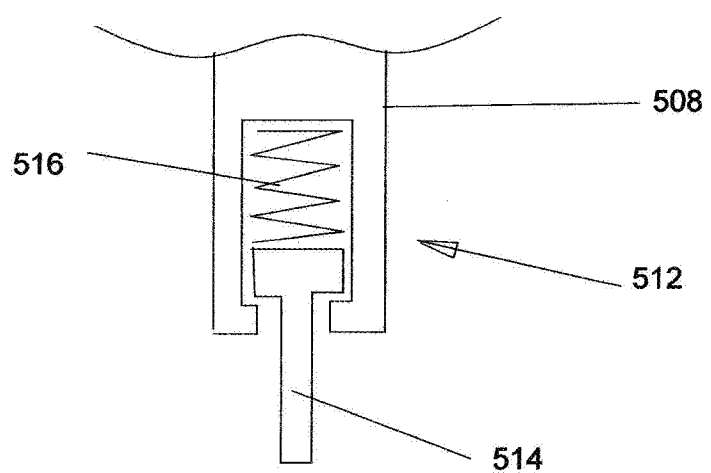
FIG. 7 is a cross section of a charging contact on a leg of a UAV being spring loaded to compensate for a non-level landing pad.

FIG. 5A illustrates schematically a UAV or drone 90. A plurality of propellers 500 are connected by arms 502 to a main body 504 that has all of the necessary and conventional devices therein such as batteries, communications, a video camera 506, etc. A plurality of landing legs 508 are attached thereto, normally four. In order to recharge the batteries therein, a pair of diagonal legs 510 acts as electrical charging contacts and are oppositely signed. FIG. 7 shows one electrical contact 512 on the leg bottom wherein a sliding pin 514 is spring 516 biased. This allows the pin to move in respond to the landing pad being non-level. FIG. 5B illustrates by top view one or more landing pads 520 for the UAVs 90, wherein the one or more landing pads 520 are in close proximity to the one or more portals 100. The landing pad 520 has a pair of charging pads 530 and 532 thereon. The charging contacts 512 on the landing legs 508 are in operable contact to the charging pads 530 and 532 to provide charging from a DC source obtaining power from an AC-to-DC converter 103 in the rental dispensing device 10. The opposite legs 508 need not be electrical contacts and are shown in FIG. 5B in a gap 540 between the pair of charging pads, for illustration only. By design, it is impossible to have both the contacts 512 on the same charging pad 530 or 532. The prior art shows numerous means for charging batteries and further includes complex devices to change batteries in UAVs. As seen in FIG. 5B, the charging pads are semi-circular, flat, separated, and are made of an electrically conductive material such as copper, etc. Further a reposition alert device 580 will cause the UAV to rotate about 180 degree or another value to correctly position the landing legs on the charging pads. Further a charge status indicator 581 is connected to the charging pads 530 and 532 and will indicate the status of the UAV batteries.

Figure 6A:
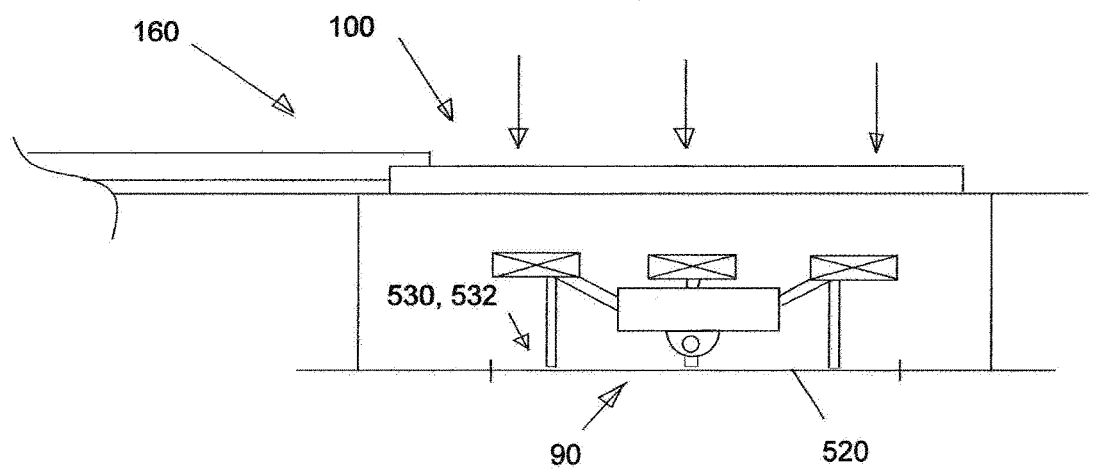
FIG. 6A is a first embodiment of a single UAV storage section of the present invention.

In one embodiment as shown in FIG. 6A, the rental dispensing device has one landing pad 520 that is in close proximity to one portal 100, directly thereunder, where the UAV 90 may be charged thereon after landing, and also the UAV 90 may be further stored thereon. There may be one or more of these in the rental dispensing device for multiple UAVs 90, each having one portal and one landing pad. Multiple units like this may be used in each housing, probably not more than 2 per device.

Figure 6B:
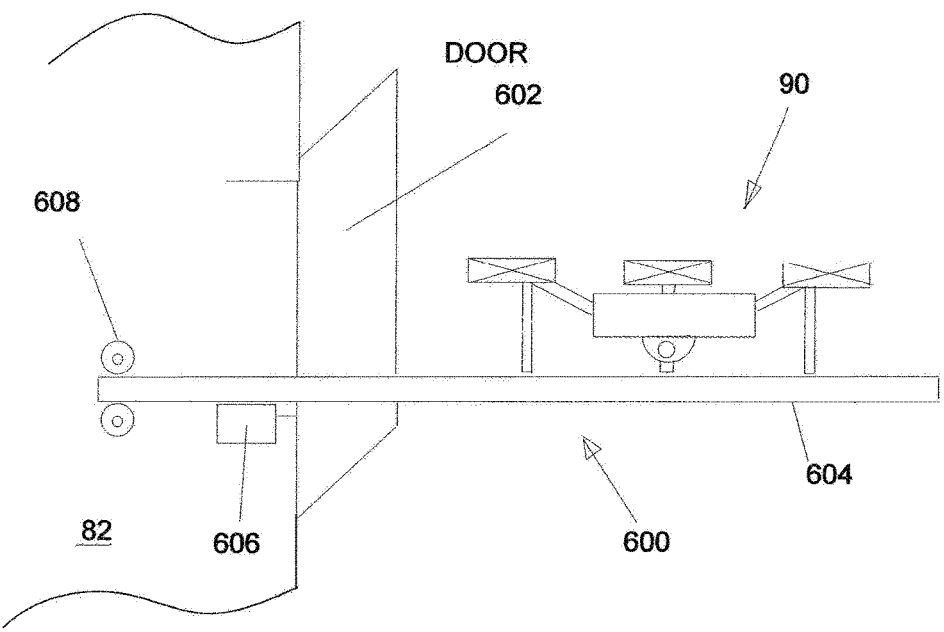
FIG. 6B is second embodiment of single UAV storage section being a plurality of sliding shelves in the dispensing device of the present invention.

Referring to FIG. 6B, in a second embodiment, the rental dispensing device may have one or more UAVs 90 that are stored on sliding shelves 600, only one shown, wherein the sliding shelves 600 act as landing pads and would have operatively charging thereon as noted above. The sliding shelf 600 would be moved in and out of the housing 82 when a door 602 is opened. The sliding shelf 600 has a rack gear 604 that is driven by a pinion gear driver 606. One or more rollers 608 provide a stable shelf. The rack gear 604 would be located on the side of the shelf 600 and not interfere with the landing pad.

FIG. 6C illustrates a third embodiment where the UAV 90 enters through a portal 100 and lands upon a landing pad 520. Charging maybe had as noted above or even in the storage section. After recharging, a translator 620, being a flat movable wall 622 is moved to push the UAV 90 from the landing pad 520 to an elevator shelf 550. The elevator shelf 550 translates vertically upon one or more rails 552 and is driven by a looped belt 554 by a motor 556. The elevator shelf 550 may be moved downward or upward as desired by the stepper motor 556. Upon reaching an empty storage section 560, the UAV 90 is pushed/moved from the elevator shelf 550 to the storage section 560.

Until recently, recreational drone flying has been limited to manual flying via handheld remote control. With the advent of automated tracking, drones have become much more versatile, allowing individuals to be tracked either visually, or via small remote carried sensors, allowing for hands free use. Some drones also implement object avoidance so that these hands free videos can be obtained in areas that are not free of obstacles. Active tracking is a feature of some drones, such as the Phantom by DJI. This allows the drone to visually track an object or person, while also avoiding obstacles. Other drones, such as the Lily drone, have implemented tracking via a tracking device. These types of drones do not always have object avoidance, but can still be used hands free in open areas. It is the advent of these hands free tracking drones that make the UAV/drone rental dispensing device a reality. Users can now realize the benefits and fun of drone use, without the extreme expense of purchasing and maintaining one that can cost upwards of $1,000.

An example of the use/mission of the drone rental dispensing device 24: The customer 22 desires to view his golf swing during practice or otherwise. The customer will enter the information in an app for the drone dispensing device on his/her smart phone. Once rented, depending on the drone, either the customer would be acquired by the drone using visual active tracking, or by using the GPS of their phone, or an external tracking device provided by the unit so the drone could follow them. Active tracking by a drone is noted by http://www.dji.com/phantom-4 where the user carries a tracking device as noted by www.lily.camera. The drone will then record the golf activity. Upon completion of recording, the drone would return and the video file will be transferred to the cloud, the customer's account and/or transmitted to the smart phone and/or actually viewed in real-time, or to an external media such as an SD card that would be provided to the user automatically from the unit. Another example is campus security. A drone dispensing device 24 will be located near or on a campus. All necessary information can be pre-recorded or recorded upon request since the user may be doing this multiple times. When the student is leaving the building at night, the student will alert the system 10 and the drone will be immediately dispatched and the drone will be made visible to the student. The drone will follow the student until requested to stop. Video information may also be transmitted live to campus security.

Since many modifications, variations, and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents

What is claimed is:

1. A rental dispensing device for renting and dispensing UAVs having video cameras thereon, said rental dispensing device comprising:
   a housing, said housing being stand-alone;
   one or more portals for UAVs to enter and exit said housing, each portal having a portal door;
   one or more landing pads for the UAVs, said one or more landing pads being in close proximity to said one or more portal doors;
   a door for accessing an interior of said housing;
   a source of electricity for providing power to said rental dispensing device;
   a storage area for storing one or more UAVs therein;
   a charging surface for providing power to said one or more UAVs for charging;
   a computer in said housing for operating programs for said rental dispensing device;
   an internet interface for providing access to and from said rental dispensing device, including communications for providing data transfer from said one or more UAVs and an external location through said computer;
   said computer further including an interface screen and a card reading device, enabling users to rent and dispense said one or more UAVs having video from the rental dispensing device.

2. The rental dispensing device as defined in claim 1, wherein said UAV is either autonomous or semi-autonomous or hands-on.

3. The rental device as defined in claim 1, within said UAV further includes active tracking capability and/or a smartphone app for flight tracking.

4. The rental dispensing device as defined in claim 1, wherein said one or more portals has a hinged door or sliding door and is located on a top or side of said housing.

5. The rental dispensing device as defined in claim 1, wherein said charging surface comprises a DC powersource or an inductive power source.

6. The rental dispensing device as defined in claim 5, wherein said UAV has a pair of charging contacts when being recharged by said DC power source.

7. The rental dispensing device as defined in claim 6, wherein said charging contacts are located on two opposite diagonal landing legs of said UAV.

8. The rental dispensing device as defined in claim 7, wherein a landing pad has a pair of charging pads thereon, said charging contacts on said landing legs of said UAV being in operable contact to said charging pads to provide charging when the UAV is located thereon.

9. The rental device as defined in claim 8, wherein said charging pads are semi-circular and separated.

10. The rental device as defined in claim 9, further including a reposition alert to cause said UAV to rotate to correctly position said landing legs on said charging pad.

11. The rental dispensing device as defined in claim 1, wherein one landing pad is in close proximity to said one or more portals and said UAV being charged thereon, the UAV being further stored thereon.

12. The rental dispensing device as defined in claim 1, wherein one or more UAVs are stored on sliding shelves, said sliding shelves being landing pads and said UAV being operatively charged thereon.

13. The rental dispensing device as defined in claim 1, further including: an elevator shelf and a storage section, wherein said UAV is moved from said landing pad to said elevator shelf, said elevator shelf moving to an empty storage section and then said UAV being moved from said elevator shelf to said storage section.

14. The rental dispensing device as defined in claim 1, wherein said interface screen and said card reader are physically separated from said housing.

15. The rental dispensing device as defined in claim 1, further including a recharging station separated from the housing.

16. The rental dispensing device as defined in claim 1, wherein said rental dispensing device operating program communicates to a rental system for obtaining information regarding flights, payments, and status of the UAVs.

17. The rental dispensing device as defined in claim 1, wherein said interface screen is driven by a computer in said housing that contains an operating program to allow a user to enter pertinent information in the rental of said UAV.

* * * * *